(12) United States Patent
Wolinsky

(10) Patent No.: US 7,951,007 B2
(45) Date of Patent: May 31, 2011

(54) METHOD AND APPARATUS USING INSERTABLY-REMOVABLE AUXILIARY DEVICES TO PLAY GAMES OVER A COMMUNICATIONS LINK

(75) Inventor: Scott Wolinsky, North Wales, PA (US)

(73) Assignee: New Illuminations LLC, Wilmington, DE (US)

( * ) Notice: Subject to any disclaimer, the term of this patent is extended or adjusted under 35 U.S.C. 154(b) by 482 days.

(21) Appl. No.: 11/765,852

(22) Filed: Jun. 20, 2007

(65) Prior Publication Data

US 2008/0020843 A1 Jan. 24, 2008

Related U.S. Application Data

(62) Division of application No. 10/143,970, filed on May 13, 2002, now abandoned.

(51) Int. Cl.
*G06F 17/00* (2006.01)
*G06F 19/00* (2006.01)
(52) U.S. Cl. .............. 463/42; 463/1; 463/40; 463/41
(58) Field of Classification Search ............ 463/40–44
See application file for complete search history.

(56) References Cited

U.S. PATENT DOCUMENTS

| | | |
|---|---|---|
| 3,654,392 A | 4/1972 | Beinhocker |
| 3,932,709 A | 1/1976 | Hoff .............................. 379/157 |
| 4,082,285 A | 4/1978 | Bathurst |
| 4,242,539 A | 12/1980 | Hashimoto ............. 379/142.01 |
| 4,372,558 A | 2/1983 | Shimamoto ................. 273/238 |
| 4,386,773 A | 6/1983 | Bronstein .................... 273/1 E |
| 4,421,314 A | 12/1983 | Stancil |
| 4,432,067 A | 2/1984 | Nielsen ........................ 364/900 |
| 4,596,390 A | 6/1986 | Studley .................... 273/148 B |
| 4,922,420 A | 5/1990 | Nakagawa ................... 364/410 |
| 4,959,783 A | 9/1990 | Scott et al. |

(Continued)

FOREIGN PATENT DOCUMENTS

JP 2000358086 12/2000

(Continued)

OTHER PUBLICATIONS

Stolowitz Ford Cowger LLP; Related Case Listing; Oct. 21, 2010; 1 Page.

(Continued)

*Primary Examiner* — Melba Bumgarner
*Assistant Examiner* — Milap Shah
(74) *Attorney, Agent, or Firm* — Stolowitz Ford Cowger LLP

(57) ABSTRACT

A method and apparatus that identifies and safely couples an insertably-removable auxiliary device (IRAD) to a processor so that games can be played over a communications link without damaging the IRAD or the processor. An auxiliary connector, into which the IRAD is inserted, is not connected to the processor until after the identity of the IRAD is determined. The processor resides in a communications device, such as a wireless telephone, walkie-talkie, toy, or the like. Upon the activation of an auxiliary mode, a user is prompted to insert an IRAD into the auxiliary connector. An IRAD used to play a game can be an auxiliary keypad, an auxiliary processor, an auxiliary display, a supplemental program module that stores computer-readable code, an electronic board game, an auxiliary graphical user interface (GUI) (e.g., auxiliary steering wheel, auxiliary joystick, virtual reality viewer), or a headset including a microphone and speaker.

28 Claims, 16 Drawing Sheets

U.S. PATENT DOCUMENTS

| | | | |
|---|---|---|---|
| 5,039,107 A | 8/1991 | Jackson | |
| 5,048,831 A | 9/1991 | Sides | 273/999.999 |
| 5,061,992 A | 10/1991 | Ueno | |
| 5,095,798 A | 3/1992 | Okada et al. | 463/35 |
| 5,114,157 A * | 5/1992 | Kita | 463/29 |
| 5,161,803 A | 11/1992 | Ohara | 273/435 |
| 5,184,830 A | 2/1993 | Okada et al. | 463/29 |
| 5,186,471 A | 2/1993 | Vancraeynest | 273/439 |
| 5,236,199 A | 8/1993 | Thompson | 273/439 |
| 5,273,228 A | 12/1993 | Yoshida et al. | |
| 5,273,288 A | 12/1993 | Teshima | 273/237 |
| 5,349,633 A | 9/1994 | Katz | 379/88 |
| 5,428,528 A | 6/1995 | Takenouchi et al. | |
| 5,497,479 A * | 3/1996 | Hornbuckle | 463/29 |
| 5,518,253 A | 5/1996 | Pocock et al. | |
| 5,541,985 A | 7/1996 | Ishii et al. | 379/111 |
| 5,558,339 A | 9/1996 | Perlman | 463/23 |
| 5,563,931 A | 10/1996 | Bishop | 379/37 |
| 5,564,700 A | 10/1996 | Celona | |
| 5,618,045 A | 4/1997 | Kagan et al. | 463/40 |
| 5,636,211 A | 6/1997 | Newlin et al. | 370/465 |
| 5,643,088 A | 7/1997 | Vaughn | 463/40 |
| 5,646,629 A | 7/1997 | Loomis | 342/357 |
| 5,654,746 A * | 8/1997 | McMullan et al. | 725/29 |
| 5,671,267 A | 9/1997 | August et al. | |
| 5,679,077 A | 10/1997 | Pocock | 436/19 |
| 5,685,775 A | 11/1997 | Bakoglu et al. | 463/41 |
| 5,707,286 A | 1/1998 | Carlson | |
| 5,738,583 A | 4/1998 | Comas et al. | 463/40 |
| 5,762,552 A | 6/1998 | Vuong et al. | |
| 5,790,652 A | 8/1998 | Gulley et al. | |
| 5,791,992 A | 8/1998 | Crump et al. | 463/41 |
| 5,793,846 A | 8/1998 | Katz | 379/127.01 |
| 5,795,156 A | 8/1998 | Redford | 434/118 |
| 5,797,085 A * | 8/1998 | Beuk et al. | 455/88 |
| 5,809,520 A | 9/1998 | Edwards et al. | 711/115 |
| 5,812,930 A | 9/1998 | Zavrel | 725/62 |
| 5,852,783 A | 12/1998 | Tabe et al. | |
| 5,859,522 A | 1/1999 | Theobald | |
| 5,864,613 A | 1/1999 | Flood | |
| 5,881,366 A | 3/1999 | Bodenmann et al. | |
| 5,907,604 A | 5/1999 | Hsu | 348/14.01 |
| 5,971,849 A | 10/1999 | Falciglia | |
| 5,971,855 A | 10/1999 | Ng | 463/42 |
| 5,999,808 A | 12/1999 | LaDue | 455/412.2 |
| RE36,574 E | 2/2000 | Hochstein | 463/42 |
| 6,042,478 A | 3/2000 | Ng | 463/44 |
| 6,080,064 A | 6/2000 | Pieterse | 463/42 |
| 6,085,112 A | 7/2000 | Kleinschmidt et al. | 455/556.1 |
| 6,117,013 A | 9/2000 | Eiba | 463/41 |
| 6,120,379 A | 9/2000 | Tanaka et al. | 463/44 |
| 6,151,511 A | 11/2000 | Cruciani | 455/558 |
| 6,165,068 A | 12/2000 | Sonoda et al. | |
| 6,188,917 B1 | 2/2001 | Laureanti | 455/573 |
| 6,231,441 B1 | 5/2001 | Golad | 463/9 |
| 6,241,612 B1 | 6/2001 | Heredia | 463/40 |
| 6,244,894 B1 | 6/2001 | Miyashita | 439/500 |
| 6,244,960 B1 | 6/2001 | Takasaka et al. | |
| 6,249,863 B1 | 6/2001 | Redford | 713/1 |
| 6,264,562 B1 | 7/2001 | McSheffrey et al. | |
| 6,278,773 B1 | 8/2001 | Perlman | 379/142.06 |
| 6,280,327 B1 | 8/2001 | Leifer | 463/39 |
| 6,287,201 B1 | 9/2001 | Hightower | |
| 6,289,464 B1 * | 9/2001 | Wecker et al. | 713/300 |
| 6,327,482 B1 | 12/2001 | Miyashita | 455/566 |
| 6,375,572 B1 | 4/2002 | Masuyama et al. | |
| 6,377,685 B1 | 4/2002 | Krishnan | 379/368 |
| 6,383,075 B1 | 5/2002 | Jeong et al. | |
| 6,393,461 B1 | 5/2002 | Okada et al. | |
| 6,453,160 B1 | 9/2002 | Thomas et al. | 455/419 |
| 6,494,762 B1 | 12/2002 | Bushmitch et al. | 446/268 |
| 6,508,710 B1 | 1/2003 | Paravia et al. | |
| 6,524,189 B1 | 2/2003 | Rautila | 463/41 |
| 6,527,641 B1 | 3/2003 | Sinclair et al. | 463/39 |
| 6,554,707 B1 | 4/2003 | Sinclair et al. | 463/39 |
| 6,579,184 B1 | 6/2003 | Tanskanen | |
| 6,612,498 B1 | 9/2003 | Lipponen et al. | 235/486 |
| 6,612,931 B2 | 9/2003 | Kojima et al. | 463/42 |
| 6,640,113 B1 | 10/2003 | Shim et al. | 455/566 |
| 6,650,895 B1 | 11/2003 | Ravishankar et al. | |
| 6,669,487 B1 | 12/2003 | Nishizawa et al. | |
| 6,681,120 B1 * | 1/2004 | Kim | 455/556.1 |
| 6,682,427 B2 | 1/2004 | Wolinsky | 463/41 |
| 6,690,947 B1 | 2/2004 | Tom | 455/566.1 |
| 6,695,702 B2 * | 2/2004 | Morita | 463/41 |
| 6,699,188 B2 | 3/2004 | Wessel | 600/300 |
| 6,712,704 B2 | 3/2004 | Eliott | 463/43 |
| 6,716,103 B1 | 4/2004 | Eck et al. | 463/45 |
| 6,718,182 B1 | 4/2004 | Kung | 455/566.1 |
| 6,785,561 B1 * | 8/2004 | Kim | 455/566 |
| 6,819,942 B2 | 11/2004 | Aotake et al. | |
| 6,852,033 B2 | 2/2005 | Kinjo et al. | |
| 6,884,171 B2 | 4/2005 | Eck et al. | |
| 6,893,347 B1 | 5/2005 | Zilliacus et al. | 463/41 |
| 6,908,389 B1 | 6/2005 | Puskala | 463/40 |
| 6,920,517 B2 | 7/2005 | Mills et al. | 710/301 |
| 6,948,083 B2 | 9/2005 | Eguchi | 713/320 |
| 6,968,206 B1 | 11/2005 | Whitsey-Anderson | 455/556.1 |
| 6,996,537 B2 | 2/2006 | Minear et al. | 705/26 |
| 7,003,328 B2 | 2/2006 | Kuwazoe | 455/566 |
| 7,063,619 B2 | 6/2006 | Wolinsky | 463/41 |
| 7,069,044 B2 | 6/2006 | Okada et al. | 455/567 |
| 7,121,962 B2 | 10/2006 | Reeves | 473/407 |
| 7,125,336 B2 | 10/2006 | Antilla | 463/40 |
| 7,153,210 B2 | 12/2006 | Yamagishi | 463/39 |
| 7,167,724 B2 * | 1/2007 | Yamagishi | 455/556.1 |
| 7,177,604 B2 | 2/2007 | Wong | 455/575.1 |
| 7,184,718 B2 | 2/2007 | Newman et al. | 455/90.3 |
| 7,194,285 B2 * | 3/2007 | Tom | 455/556.1 |
| 2001/0003191 A1 | 6/2001 | Kovacs et al. | 709/223 |
| 2001/0050977 A1 | 12/2001 | Gerszber et al. | |
| 2002/0016188 A1 * | 2/2002 | Kashiwamura | 455/568 |
| 2002/0022522 A1 | 2/2002 | Yamada | 463/42 |
| 2002/0025829 A1 | 2/2002 | Kitatani | |
| 2002/0032057 A1 * | 3/2002 | Ebihara | 463/42 |
| 2002/0049074 A1 * | 4/2002 | Eisinger et al. | 455/552 |
| 2002/0049975 A1 | 4/2002 | Thomas et al. | |
| 2002/0061743 A1 | 5/2002 | Hutcheson et al. | |
| 2002/0065097 A1 | 5/2002 | Brockenbrough et al. | |
| 2002/0082067 A1 | 6/2002 | McKay et al. | |
| 2002/0094845 A1 | 7/2002 | Inasaka | 455/566 |
| 2002/0103023 A1 | 8/2002 | Matsuura | 345/467 |
| 2002/0119819 A1 | 8/2002 | Kunzle | |
| 2002/0147044 A1 | 10/2002 | Jakobsson | 380/251 |
| 2002/0174277 A1 | 11/2002 | Hoshino et al. | 379/93.15 |
| 2002/0183118 A1 | 12/2002 | Wolinsky | |
| 2003/0003993 A1 * | 1/2003 | Leifer et al. | 463/39 |
| 2003/0032486 A1 | 2/2003 | Elliott | |
| 2003/0033209 A1 * | 2/2003 | Minear et al. | 705/26 |
| 2003/0068034 A1 | 4/2003 | Silvester | 379/433.12 |
| 2003/0071791 A1 | 4/2003 | Hanson | 710/301 |
| 2003/0096650 A1 | 5/2003 | Eguchi et al. | |
| 2003/0100347 A1 * | 5/2003 | Okada et al. | 455/567 |
| 2003/0114224 A1 * | 6/2003 | Anttila et al. | 463/40 |
| 2003/0144022 A1 | 7/2003 | Hatch | 455/550 |
| 2003/0165237 A1 * | 9/2003 | Farr et al. | 379/430 |
| 2004/0039860 A1 | 2/2004 | Mills et al. | |
| 2004/0110566 A1 * | 6/2004 | Schneider | 463/43 |
| 2004/0111755 A1 * | 6/2004 | Perlman | 725/133 |
| 2004/0116155 A1 | 6/2004 | Aisenberg | 455/557 |
| 2004/0127268 A1 | 7/2004 | Wong et al. | |
| 2004/0185914 A1 | 9/2004 | Ohmura | 455/566 |
| 2004/0203505 A1 | 10/2004 | Newman et al. | |
| 2004/0203588 A1 * | 10/2004 | Yamagishi | 455/410 |
| 2004/0225796 A1 | 11/2004 | Hanson | 710/102 |
| 2006/0040746 A1 | 2/2006 | Eguchi et al. | 463/43 |
| 2006/0148568 A1 * | 7/2006 | Schultz et al. | 463/42 |
| 2006/0154710 A1 | 7/2006 | Serafat | 463/43 |

FOREIGN PATENT DOCUMENTS

| | | |
|---|---|---|
| WO | 93/23125 | 11/1993 |
| WO | 0021265 | 4/2000 |

OTHER PUBLICATIONS

Monopoly 2, 2000; (online), retrieved on Aug. 18, 2004, from the GameSpy.com page using Internet, URL:http://archive.gamespy.com/games/33.shtml.
GENCO Tic Tac Phone Description from GENCO Website.
"Merlin the Electronic Wizard", Parker Brothers, 1978; http://handheldmusemum.com/Manuals/ParkerBros-Merlin.pdf; http://en.wikipedia.org/wiki/Merlin_(game)>; last visited Jun. 15, 2010.
"Master Merlin Nine All New Challenging Games"; Parker Bros, 1982; http://www.handheldmuseum.com/Manuals/ParkerBros-MasterMerlin.pdf; last visited Jun. 15, 2010.
"Microsoft Windows Installed Games"; Computer Hope.com; pp. 1-4; Retrieved from www.computerhope.com/ games/games/wingames.htm on Feb. 12, 2008.

* cited by examiner

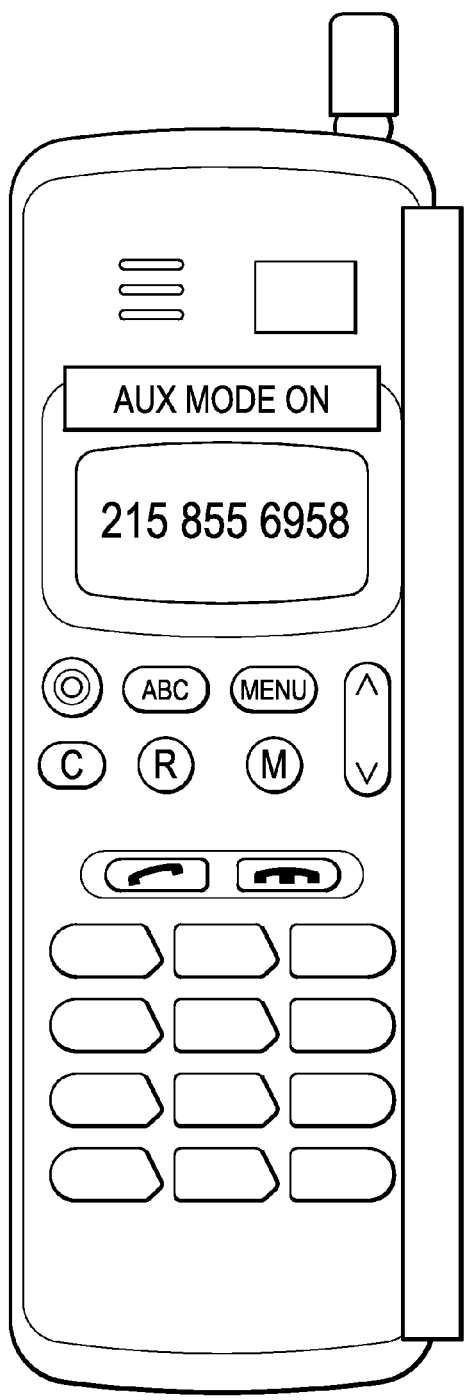
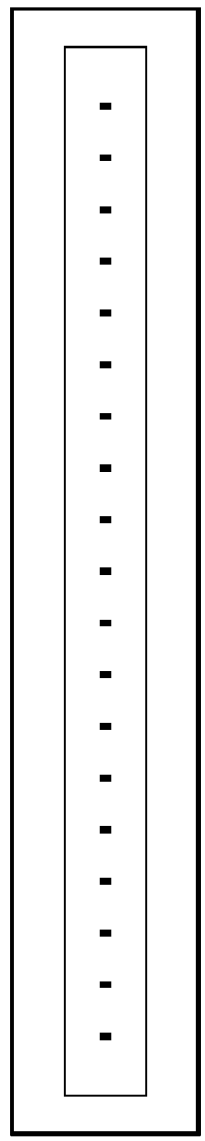
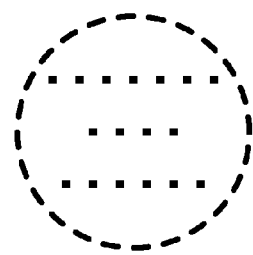
FIG. 6A
FIG. 6B
FIG. 6C

METHOD AND APPARATUS USING INSERTABLY-REMOVABLE AUXILIARY DEVICES TO PLAY GAMES OVER A COMMUNICATIONS LINK

CROSS-REFERENCE TO RELATED APPLICATIONS

This application is a divisional application of U.S. patent application Ser. No. 10/143,970 filed May 13, 2002, which has been abandoned. U.S. Ser. No. 10/143,970 is related to U.S. patent application Ser. No. 09/870,210 entitled "METHOD AND APPARATUS FOR SIMULATING GAME ACCESSORIES," invented by Scott Wolinsky and filed on May 30, 2001, which has been abandoned.

This application is also related to U.S. patent application Ser. No. 09/823,877 entitled "METHOD AND APPARATUS FOR IDENTIFYING GAME PLAYERS AND GAME MOVES," invented by Scott Wolinsky and filed on Mar. 29, 2001, which is patented as U.S. Pat. No. 7,063,619.

FIELD OF THE INVENTION

The present invention relates to the use of accessories with a communication device, such as a telephone or the like, to extend the capabilities and enhance the experience of using the device to play games over a communications link.

BACKGROUND OF THE INVENTION

There are numerous known remote game systems in which players, present at various remote locations, can play a game by communicating coded information relating to the state of the game through a common communication network, such as a telephone line.

By way of a first example, in U.S. Pat. No. 4,372,558 entitled "Remote Gaming Apparatus" and issued to Shimamoto et al. on Feb. 8, 1983, each player has a dedicated game apparatus that detects and displays the position of game pieces (i.e., chess pieces). Each dedicated gaming apparatus has communications hardware that transmits and receives, over a phone system, coded information relating to the position of the game pieces. In this manner, each dedicated gaming apparatus displays the current position of the game pieces as effected by both players.

By way of a second example, U.S. Pat. No. 5,186,471 entitled "Interactive Telephone Gaming System" and issued to Vancraeynest on Feb. 16, 1993, discloses a gaming apparatus used with a telephone network which supports standard dual tone multi-frequency (DTMF) signals. One or more players use a modified telephone station to play a game with a network gaming apparatus by receiving a sequence of DTMF tones and replicating the same sequence DTMF tones by pressing tone keys that correspond to the received sequence of DTMF tones. Each tone key has a corresponding light emitting diode (LED) which illuminates in response to receiving a corresponding DTMF signal from the network gaming apparatus. The illumination of the LEDs provide visible cues to the player at the modified telephone station to assist the player in matching the auditory pattern of DTMF tones generated by the network gaming apparatus.

By way of a third example, U.S. Pat. No. 5,273,288 entitled "Communication Terminal Used As A Game Machine" and issued to Teshima et al. on Dec. 28, 1993, discloses a communication terminal used to play a game with an opponent through a telephone line. The communication terminal comprises a push button type telephone connected parallel to the communication terminal so that a voice signal of the push button type telephone is simultaneously transmitted to the opponent with a PB signal and a position signal. Accordingly, it is possible to talk with an opponent during game play.

By way of a fourth example, U.S. Pat. No. 6,080,064 entitled "Device For Playing Games Via A Communications Network, And A Game System Using A Communications Network" and issued to Pieterse et al. on Jun. 27, 2000, discloses apparatus using a pointing device such as a joystick or the keys of a telephone set to generate DTMF pointing signals. Pieterse also discloses using the keys of a telephone set to transmit game instructions, such as "Fire", "Start", "Stop" and "Hold".

Although these known remote gaming systems succeed in providing entertainment to remotely located game players, they pose a problem in that the equipment used to play games is large and bulky, and thus is not portable. Furthermore, the variety of the types of games played is limited based on the fixed design of the gaming systems.

Additionally, computer games, played via a server located in a telephone network or over the Internet, normally require the user to subscribe to a service and/or pay to play a game. For such games, it is difficult to set up a game with a known opponent. Often, game players are playing alone or against a computer. In other cases, players participating in game play do not know who their opponents are, and thus the personal interaction with friends and family members is lost. Further, such games do not allow parties having a conversation to spontaneously play a game by placing their communication devices in a game mode.

It is therefore an object of the present invention to incorporate a flexible compact gaming system into a portable communication terminal, such that parties having a conversation via a communications link can initiate game play, or carry out other specialized communication functions over the communications link at any desired time during the conversation.

SUMMARY OF THE INVENTION

In accordance with the principles of the present invention, the above and other objectives are realized in an apparatus and method for enabling a user, already engaged in conversation with another party over a communications link using a communications device, to insert additional peripherals (auxiliary devices), having additional processing, memory, software and game move control capability, into a communications device to play a game over the communications link. The present invention can be incorporated into wireless telephones (e.g., cellphones), walkie-talkies, wireless toys and other types of transceivers.

More particularly, once a communications link (e.g., wired, wireless, etc.) is established between two or more communications devices, each device may be placed in an auxiliary mode which waits for an insertably-removable auxiliary device (IRAD) to be inserted into an auxiliary connector mounted on a surface the communications device and be identified, prior to being connected to a processor residing within the communications device. In certain cases, a signal may be generated and sent over the communications link to the other communications device(s), indicating to a party the type of IRAD that has been inserted in another party's communications device (e.g., a Donkey Kong supplemental program module). Furthermore, each IRAD will have an identity that can be read, displayed and/or processed by a processor within the communications device that operates independently to carry out communications functions but interacts with the IRAD to carry out auxiliary functions, such as providing a medium for playing a game.

In one embodiment of the present invention, a wireless telephone is used by a game player to play a game with at least one other game player over a communications link. The wireless telephone includes an auxiliary connector mounted on a surface of the wireless telephone and an IRAD. The IRAD is used to play the game only after the IRAD is inserted into the auxiliary connector and identified.

The wireless telephone may further include a keypad, a processor and a gateway circuit. The key pad is used to dial a telephone number to establish the communications link. The gateway circuit is coupled to the auxiliary connector and the processor. The auxiliary connector is coupled to the processor through the gateway circuit only after the IRAD is inserted into the auxiliary connector and identified.

The wireless telephone may further include an indicator circuit and an auxiliary device identification circuit. The indicator circuit is coupled to the processor and indicates that the IRAD should be inserted into the auxiliary connector, by outputting a visual message and/or an audible message. The auxiliary device identification circuit is coupled to the auxiliary connector, the processor and the gateway circuit. The auxiliary device identification circuit may be used to identify the IRAD. The IRAD may be an auxiliary keypad, an auxiliary processor, an auxiliary display used to view the game, a supplemental program module that stores computer-readable code, an electronic game board, an auxiliary graphical user interface (GUI) (e.g., a steering wheel, joystick, virtual reality viewer, or the like), a headset including a microphone and speaker, a video camera, a computer, a fax machine, a voice/video/data recorder, or the like.

In another embodiment of the present invention, a method is used by a game player to play a game with at least one other game player over a communications link. The method includes inserting an IRAD into an auxiliary connector mounted on the surface of a wireless telephone. The IRAD is then identified. The IRAD is used to play the game only after it is inserted into the auxiliary connector and identified.

The wireless telephone may include a processor. The communications link may be established using the wireless telephone. An indication that the IRAD should be inserted into the auxiliary connector may be implemented by outputting a visual message and/or audible message. The auxiliary connector may be coupled to the processor only after the IRAD is inserted into the auxiliary connector and identified.

In yet another embodiment of the present invention, a wireless telephone is used by a game player to play a game with at least one other game player over a communications link. The wireless telephone includes an auxiliary connector mounted on a surface of the wireless telephone, an IRAD used to play the game, and a processor which couples with the IRAD only after the IRAD is inserted into the auxiliary connector and identified.

In yet another embodiment of the present invention, a wireless telephone is used by a game player to play a game with at least one other game player over a communications link. The wireless telephone includes an auxiliary connector mounted on a surface of the wireless telephone, a processor, and a gateway circuit which couples the processor to the auxiliary connector only after an IRAD used to play the game is inserted into the auxiliary connector and identified.

In yet another embodiment of the present invention, an apparatus used to play a game includes an auxiliary connector mounted on a surface of the apparatus, a processor, and an IRAD used to play the game, wherein the IRAD is coupled to the processor only after the IRAD is inserted into the auxiliary connector and identified.

The apparatus may be a wireless telephone. The apparatus may be connected to at least one of a set-top box, a television and a video player/recorder. The apparatus may further include a gateway circuit coupled to the auxiliary connector and the processor. The auxiliary connector may be coupled to the processor through the gateway circuit only after the IRAD is inserted into the auxiliary connector and identified.

In yet another embodiment of the present invention, an apparatus used by a game player to play a game includes a connector, a processor and an indicator circuit. The indicator circuit is coupled to the processor. The indicator circuit indicates to the game player that a particular type of insertably-removable auxiliary device (IRAD) should be inserted into the connector.

The apparatus may receive information about the particular type of IRAD over a communications link. A first wireless telephone may transmit the information to the apparatus over the communications link. The apparatus may be a second wireless telephone. The indicator circuit may output at least one of a visual message and an audible message that includes the information.

In yet another embodiment of the present invention, a telephone is used to play a game with a remotely located game player. The telephone includes a keypad, a connector and an IRAD. The keypad is used to dial a telephone number of the remotely located game player. The IRAD is used to play the game. The IRAD is inserted into the connector after the telephone number is dialed and a communications link is established with the remotely located game player.

The IRAD may be at least one of a processor, a display, a supplemental program module that stores computer-readable code, an electronic game board, and a graphical user interface (GUI). The telephone may further include an indicator circuit which prompts a user of the telephone to insert the IRAD into the connector in response to the user activating an auxiliary mode of the telephone.

In yet another embodiment of the present invention, a method used to play a game with a remotely located game player includes establishing a communications link by dialing a telephone number of the remotely located game player, and inserting an auxiliary device, used to play the game, into a connector provided on a surface of a telephone used to dial the telephone number.

In yet another embodiment of the present invention, a communication apparatus includes a connector, and a circuit which automatically prompts a user of the apparatus to insert a particular type of auxiliary device into the connector, in response to the circuit receiving information over a communications link from another communication apparatus that identified the particular type of auxiliary device. The communication apparatus may be at least one of a wireless telephone, a wired telephone, a walkie-talkie, a wireless toy, and a transceiver.

In yet another embodiment of the present invention, a method of implementing an auxiliary feature of a communication apparatus including a processor includes prompting a user of the apparatus to insert an auxiliary device into a connector provided on a surface of the apparatus in response to the user activating an auxiliary mode of the apparatus. The method also includes selectively coupling the inserted auxiliary device to the processor, only after the auxiliary device has been electronically identified by the apparatus.

In yet another embodiment of the present invention a communications device includes a connector, a processor, a gateway circuit coupled to the connector and the processor, an auxiliary device identification circuit coupled to the connector, the processor, and the gateway circuit, and an IRAD. The IRAD is coupled to the gateway circuit and the auxiliary device identification circuit when it is inserted into the connector.

The IRAD may be coupled to the processor through the gateway circuit when at least one of the auxiliary device identification circuit and the processor validates the identity of the IRAD.

The communications device may be one of a wireless telephone and a wired telephone. The IRAD may be used by a game player to play a game with at least one other game player over a communications link.

In yet another embodiment of the present invention, an IRAD is used to play a game when inserted into an auxiliary connector coupled to a game system circuit. The IRAD includes a connector that selectively mates with the auxiliary connector, and an identification circuit. The IRAD is not used to play the game until after (i) the IRAD is identified (ii) the identity of the IRAD is transmitted over a communications link, and (iii) a response to the transmitted identity is received over the communications link. The game system circuit may be a component of a wireless telephone, and the communications link is established via an antenna of the wireless telephone. The IRAD may further include a supplemental program module that stores computer-readable code used to play the game.

In yet another embodiment of the present invention, a wireless telephone used by a game player to play a game includes a keypad used to dial telephone numbers, a telephone number display, an auxiliary connector mounted on a surface of the wireless telephone, and an insertably-removable auxiliary display used by the game player to view the game when the auxiliary display is inserted into the auxiliary connector.

In yet another embodiment of the present invention, an apparatus used by a game player to play a game includes a display which presents information not related to the game, an auxiliary connector mounted on a surface of the apparatus, and an insertably-removable auxiliary display used by the game player to view the game when the auxiliary display is inserted into the auxiliary connector.

In yet another embodiment of the present invention, a hand-held portable device includes a fixed display, an auxiliary connector mounted on a surface of the apparatus, and an insertably-removable auxiliary display used by a user to view information not presented on the fixed display when the auxiliary display is inserted into the auxiliary connector.

The fixed display may present telephone call information and the auxiliary display may present game information. The hand-held portable device may be one of a wireless telephone and a wired telephone.

BRIEF DESCRIPTION OF THE DRAWINGS

The following detailed description of preferred embodiments of the present invention, will be better understood when read in conjunction with the appended drawings. For the purpose of illustrating the present invention, there is shown in the drawings embodiments which are presently preferred. It should be understood, however, that the invention is not limited to the precise arrangements and instrumentalities shown. In the drawings:

FIGS. 6A, 6B and 6C illustrate how an auxiliary connector may be configured in accordance with the present invention;

DETAILED DESCRIPTION OF ILLUSTRATIVE EMBODIMENTS

The present invention is an apparatus and method using insertably-removable auxiliary devices (IRADs) to play games and to provide a means for interfacing different types of auxiliary apparatus with a portable telephone. In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

Figure 1:
FIG. 1 illustrates use of a plurality of wireless terminals for spontaneous game playing during an ongoing conversation in accordance with the present invention.
Figure 1:
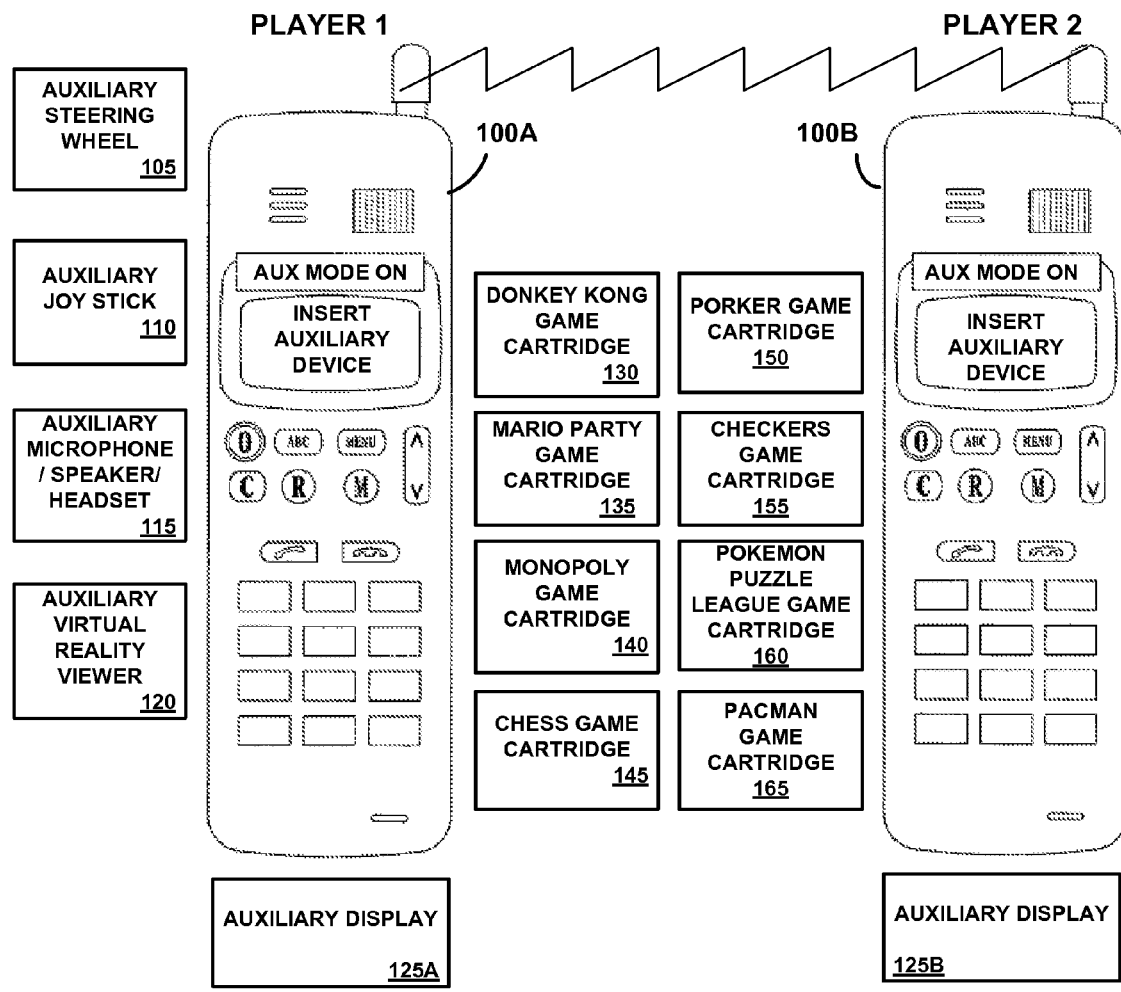

Referring now to FIG. 1, wireless communication between two players is illustrated in accordance with the present invention. Scott calls his 11-year-old son Bobby and informs Bobby over an established communications link that he will have to work late. Both Scott and Bobby are each equipped with a wireless communication terminal 100A, 100B, in accordance with the present invention. During their conversation, Scott asks Bobby, "what game would you like to play?" Bobby indicates that he would like to play "Pokemon Puzzle League." Scott and Bobby energize an auxiliary (AUX) mode button on each of their terminals. Before doing so, the terminals performed as standard cellphones. Upon activating the AUX mode, the terminals indicate, either via audible or visible means, that an AUX device should be inserted into the terminal. Scott searches through a series of game cartridges 130, 135, 140, 145, 150, 155, 160 and 165 (stored conveniently in a pouch also used to carry the telephone, or in Scott's desk drawer) and inserts a "Pokemon Puzzle League" game cartridge 160 into an auxiliary connector on his terminal. Scott's terminal will then indicate that a "Pokemon Puzzle League" game cartridge has been inserted into the terminal after communicating with an ID circuit within game cartridge 160. Scott's terminal will then transmit a signal including the identification of the game cartridge to Bobby's terminal over the previously established communications link. Bobby's terminal then processes the signal and indicates that a "Pokemon Puzzle League" game cartridge should be inserted into Bobby's terminal. Once Bobby inserts the correct game cartridge, and the identification of the inserted game cartridge is confirmed, Bobby's terminal will send a signal back to Scott's terminal indicating that the game may begin. As an alternative, one game cartridge could be used in Scott's terminal to host a game played by both Scott and Bobby. At the end of the game, the players may remove their game cartridges and insert a different game cartridge. Thus the game cartridges are "insertably-removable" into and from an auxiliary connector located on each of their terminals.

Both Scott and Bobby may insert auxiliary displays 125A, 125B into their respective terminals such that they can more easily view the game on a larger screen. Scott and Bobby may also insert a control device, such as an auxiliary joystick 110, to control player movements during the game. Other games may require an auxiliary steering wheel 105, auxiliary microphone, speaker or headset 115, an auxiliary virtual reality viewer 120, or the like.

Figure 2A:
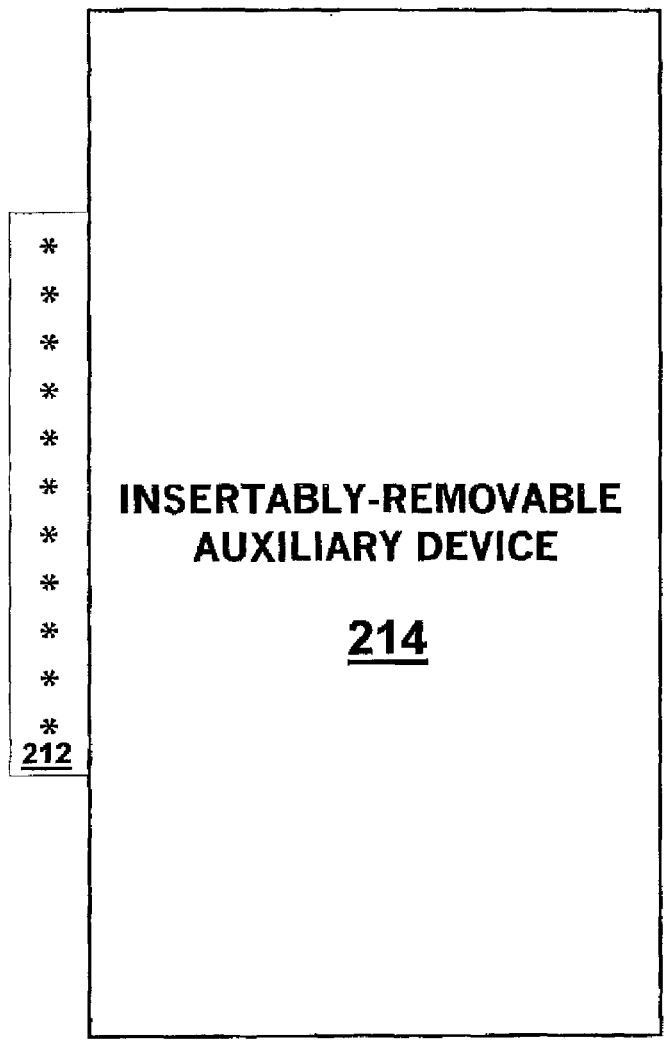
FIGS. 2A, 2B, 2C and 2D illustrate different embodiments of an insertably-removable auxiliary device used in accordance with the present invention.

FIG. 2A shows an IRAD 214 in accordance with one embodiment of the present invention. The IRAD 214 includes a multi-pin connector 212 directly affixed to the IRAD 214. The connector 212 mates with a connector present on the surface of a communications terminal (e.g., wireless telephone) used in accordance with the present invention. This embodiment provides the most compact and convenient design for practicing the present invention.

Figure 2B:
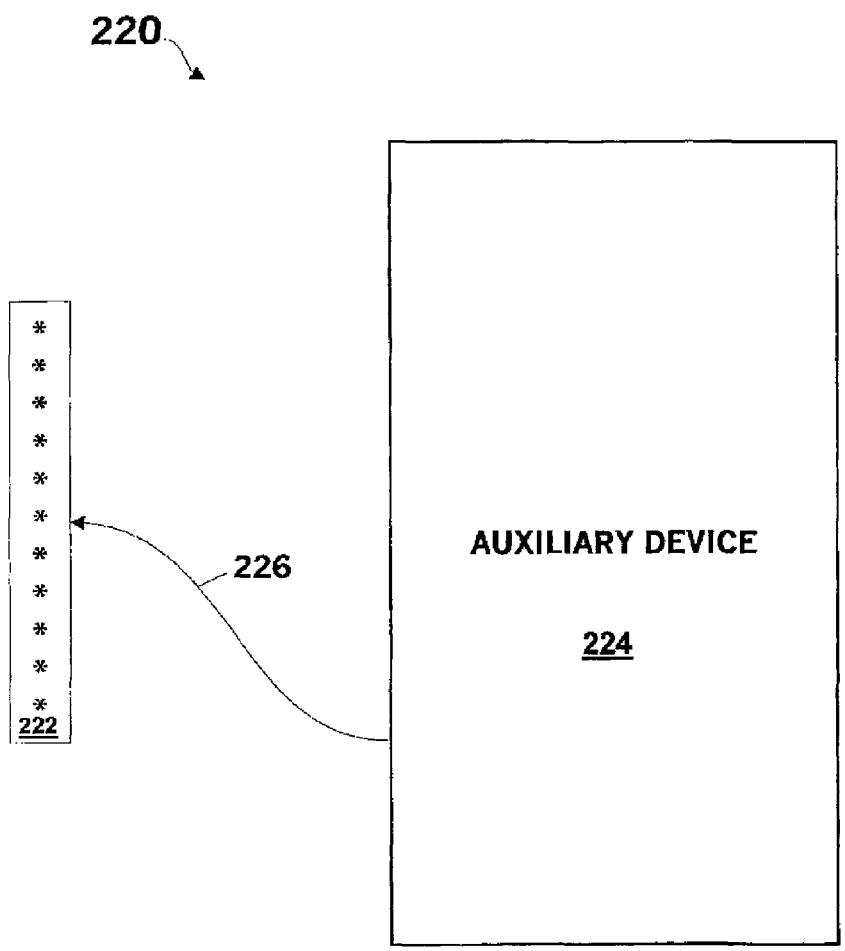

FIG. 2B shows an IRAD 220 in accordance with another embodiment of the present invention. The IRAD 220 includes a multi-pin connector 222 that is connected to an auxiliary device 224 through a cable or other communication means 226. The connector 222 mates with a connector present on the surface of a communications terminal (e.g., wireless telephone) used in accordance with the present invention.

Figure 2C:
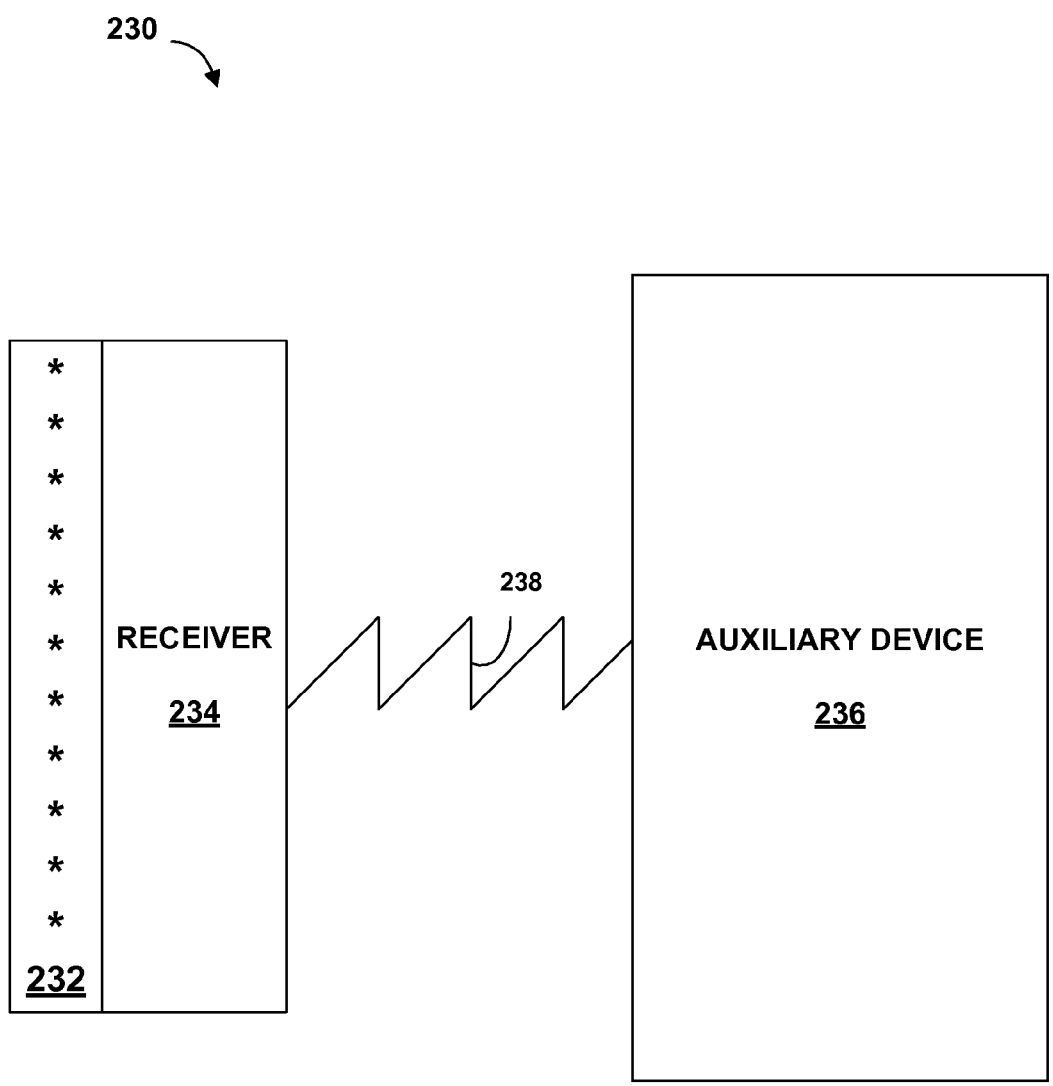

FIG. 2C shows an IRAD 230 in accordance with another embodiment of the present invention. The IRAD 230 includes a multi-pin connector 232 directly affixed to a receiver 234. The connector 232 mates with a connector present on the surface of a communications terminal (e.g., wireless telephone) used in accordance with the present invention. The receiver 234 receives instructions from an auxiliary device 236 via a wireless (or wired) medium 238. Thus, although the auxiliary device 236 may be remotely located from the terminal, it is equivalent to being an insertably-removable device, because it communicates with such a device.

Figure 2D:
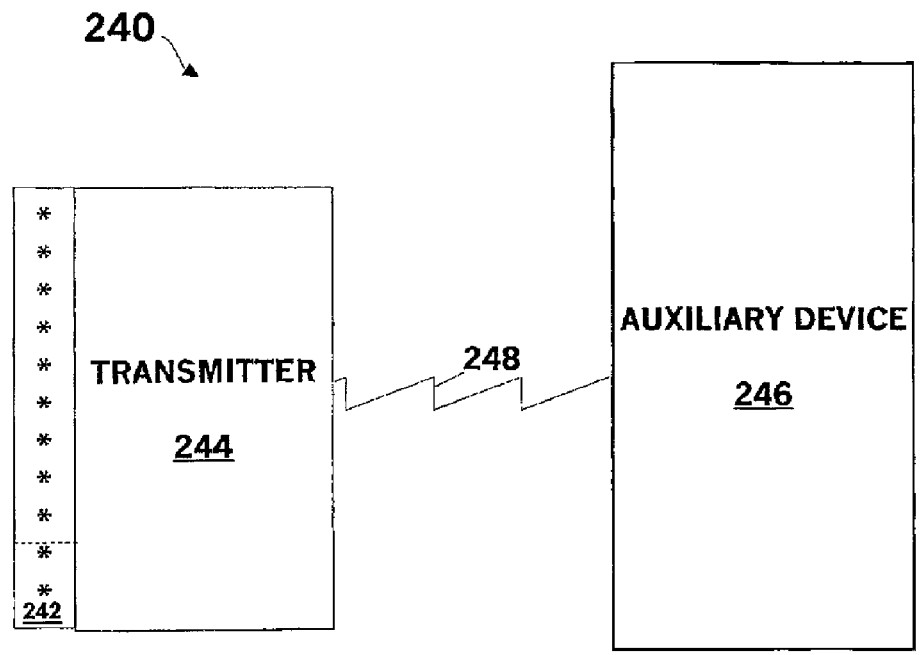

FIG. 2D shows an IRAD 240 in accordance with another embodiment of the present invention. The IRAD 240 includes a multi-pin connector 242 directly affixed to a transmitter 244. The connector 242 mates with an auxiliary connector present on the surface of a communications terminal (e.g., wireless telephone) used in accordance with the present invention. The transmitter 244 sends instructions to an auxiliary device 246 via a wireless (or wired) medium 248. Thus again, although the auxiliary device 246 may be remotely located from the terminal, it is equivalent to being an insertably-removable device, because it communicates with such a device.

Figure 3:
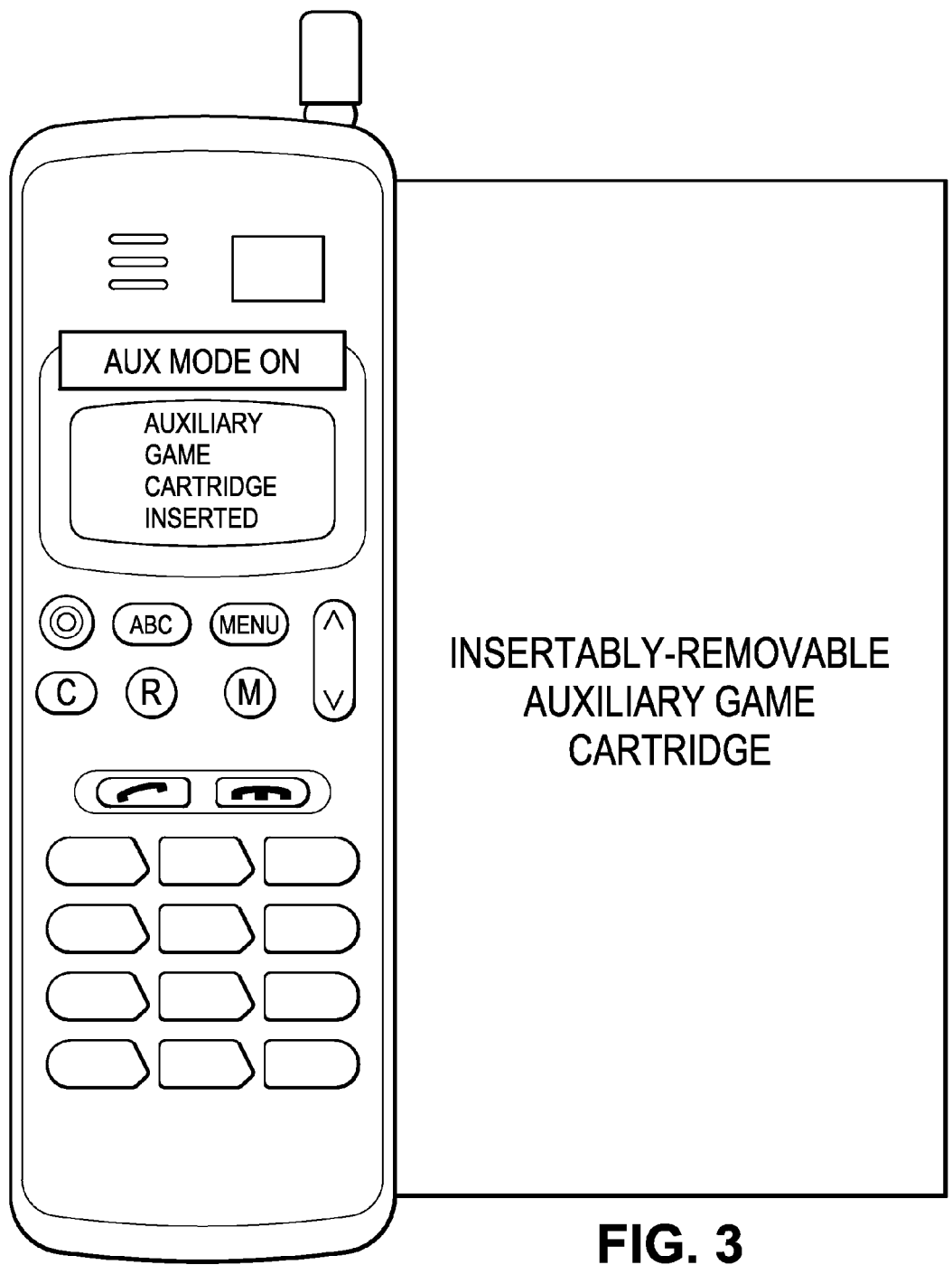
FIG. 3 shows a wireless telephone in an auxiliary mode with an auxiliary game cartridge inserted therein in accordance with the present invention.

FIG. 3 shows an example of an IRAD which is a game cartridge inserted into a wireless telephone. Once inserted and identified, an acknowledgement of the type of the IRAD may appear on a display of the wireless telephone, or may be audibly outputted by a speaker of the wireless telephone. The IRAD will not be allowed to interact with a processor within the wireless telephone until properly identified.

Figure 4:
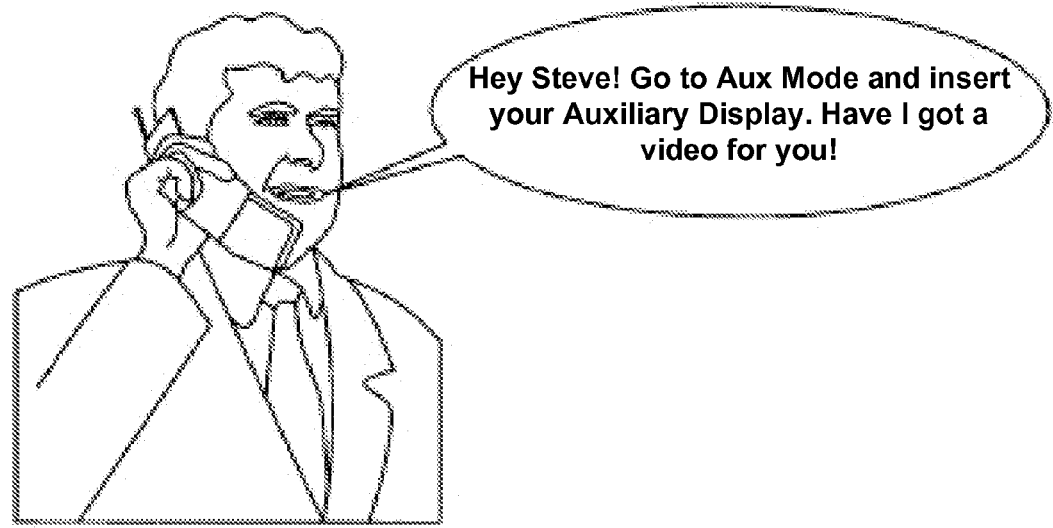
FIG. 4 illustrates examples of different types of auxiliary devices that may be used in accordance with the present invention.
Figure 4:
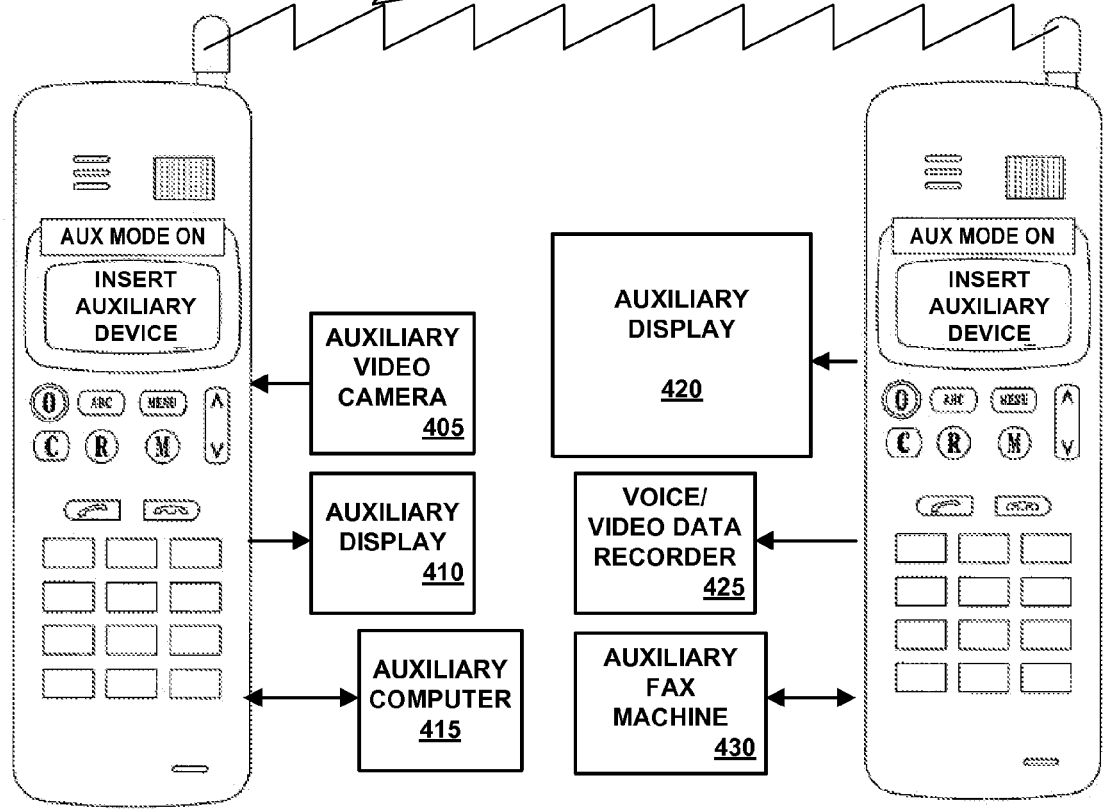

FIG. 4 provides an example of the broad concepts that may be practiced using the present invention. The present invention enables a wireless telephone to be used as an interface for any specialized auxiliary communications and/or control devices, such as a video camera 405, displays 410,420 (e.g., computer monitor, cable set-top box/television, or the like), computer 415, voice/video/data recorder 425, and fax machine 430, to communicate over a communications link established using the wireless telephone.

Figure 5A:
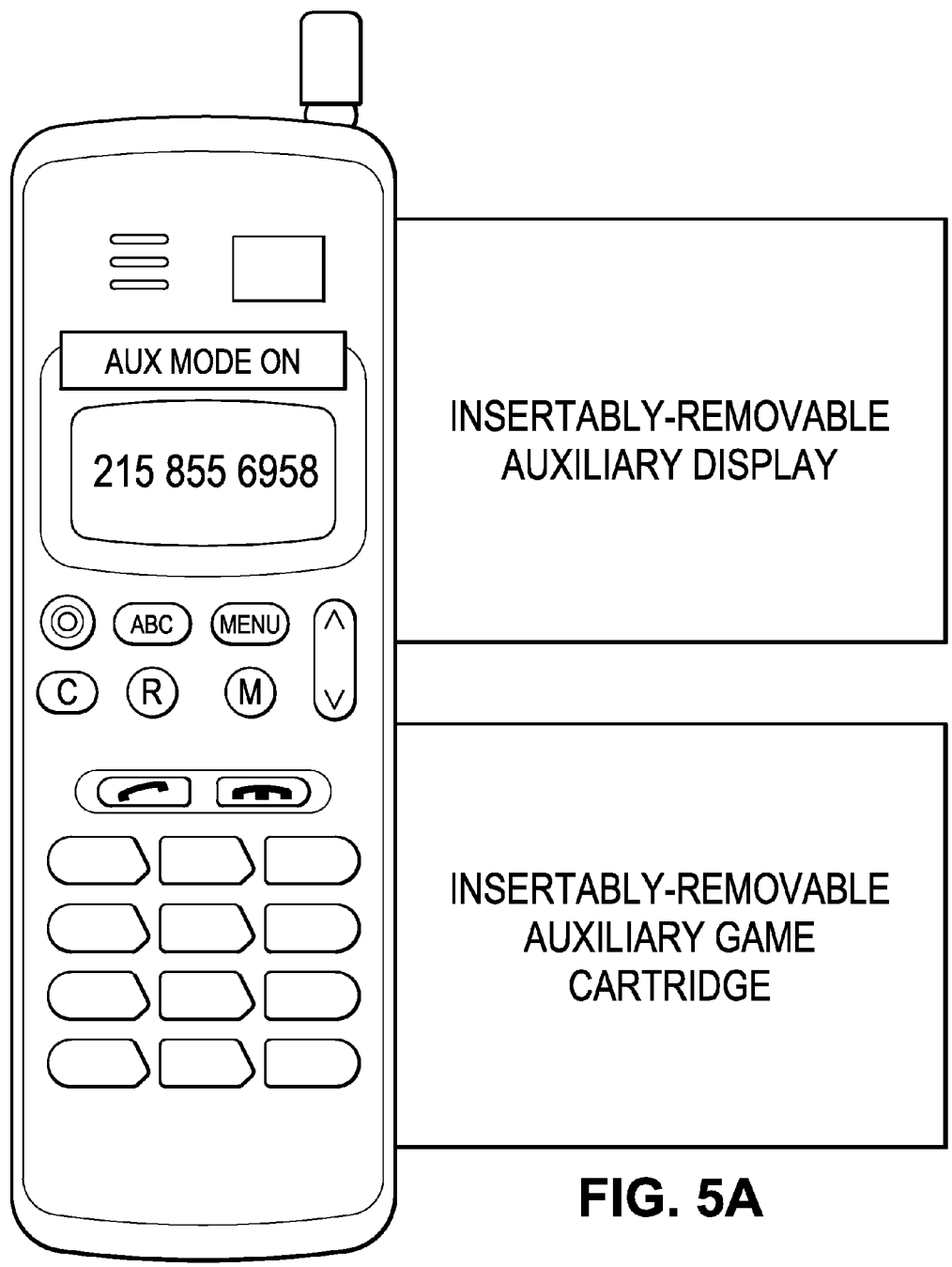
FIGS. 5A, 5B, 5C and 5D show various embodiments of using game cartridges and auxiliary displays in accordance with the present invention.

FIG. 5A shows that a plurality of IRADs may interface with a wireless telephone at the same time in accordance with the present invention. Furthermore, FIG. 5A illustrates a hand-held portable device, comprising a fixed display that presents telephone call information (e.g., telephone number 215 855 6958) and an insertably-removable auxiliary display which is used by a user to view information not presented on the fixed display (e.g., a game). The auxiliary display adds "real-estate" to the device and enhances the viewing of specific types of information. It would not be practical to view a monopoly board on the small fixed display provided by standard wireless telephones. The use of an IRAD enables a user to take advantage of using a small base unit for basic tasks, such as establishing a communications link, while enabling the user expand the features of the base unit as desired by attaching IRADs.

Figure 5B:
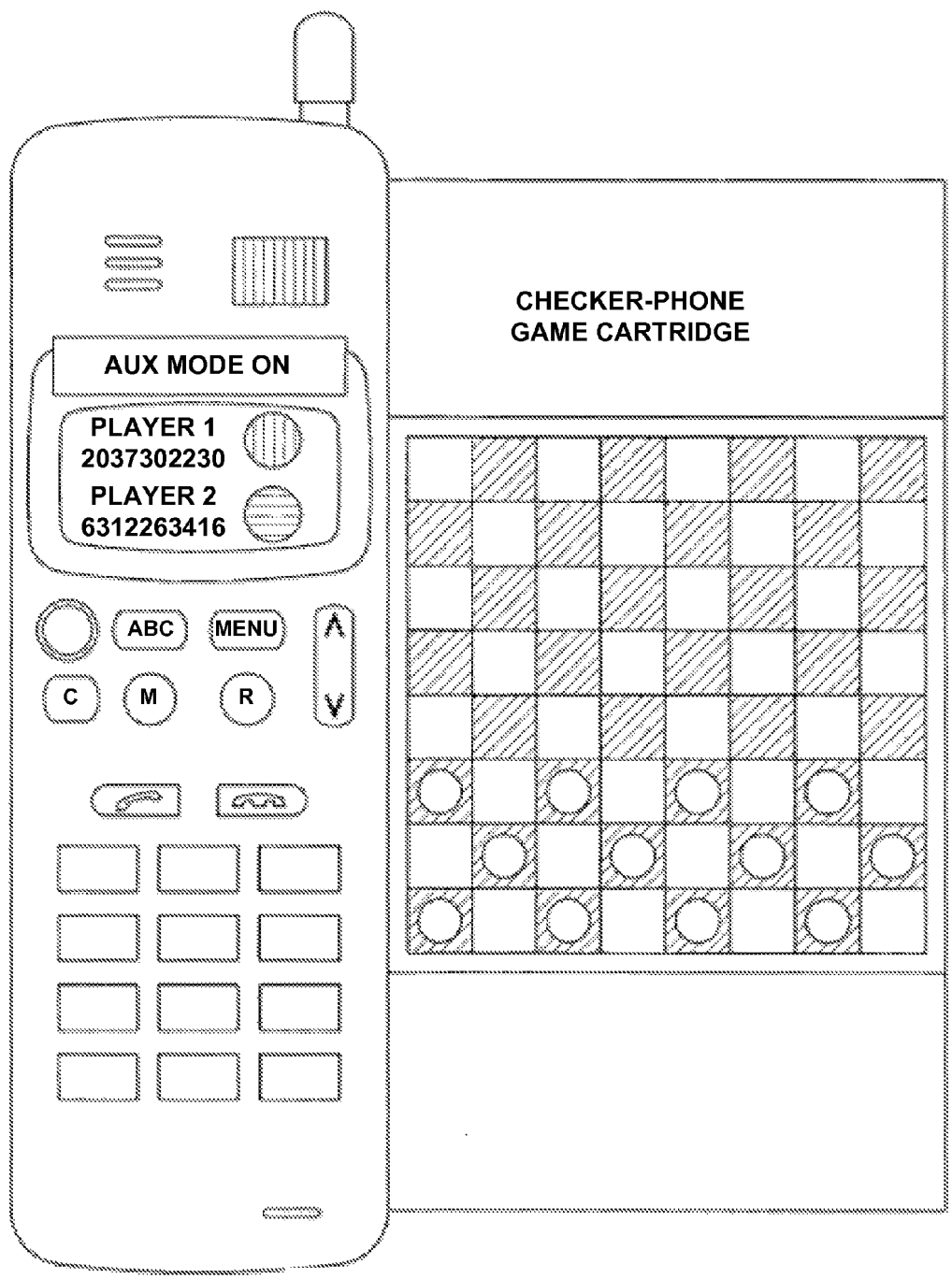

FIG. 5B shows an embodiment of a game cartridge and display used for playing a game of checkers over a communications link established by a wireless telephone in accordance with the present invention. Note that information about the players is shown on the wireless telephone's display, while the game board and player moves are displayed on an auxiliary display that operates in conjunction with an auxiliary game cartridge.

Figure 5C:
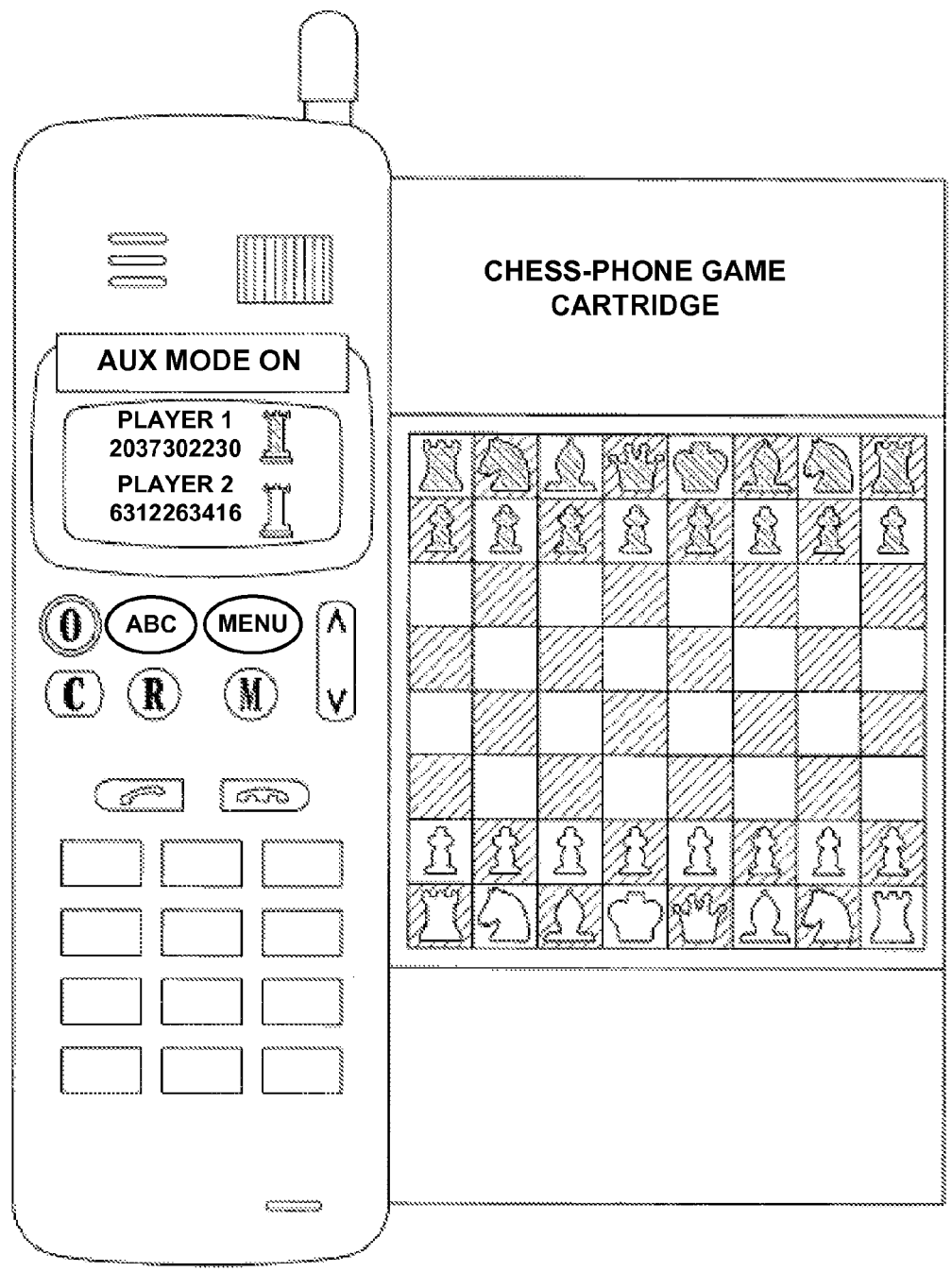

FIG. 5C shows another embodiment of a game cartridge and display used for playing a game of chess over a communications link established by a wireless telephone in accordance with the present invention. Again, note that information about the players is shown on the wireless telephone's display, while the game board and player moves are displayed on an auxiliary display that operates in conjunction with an auxiliary game cartridge.

Figure 5D:
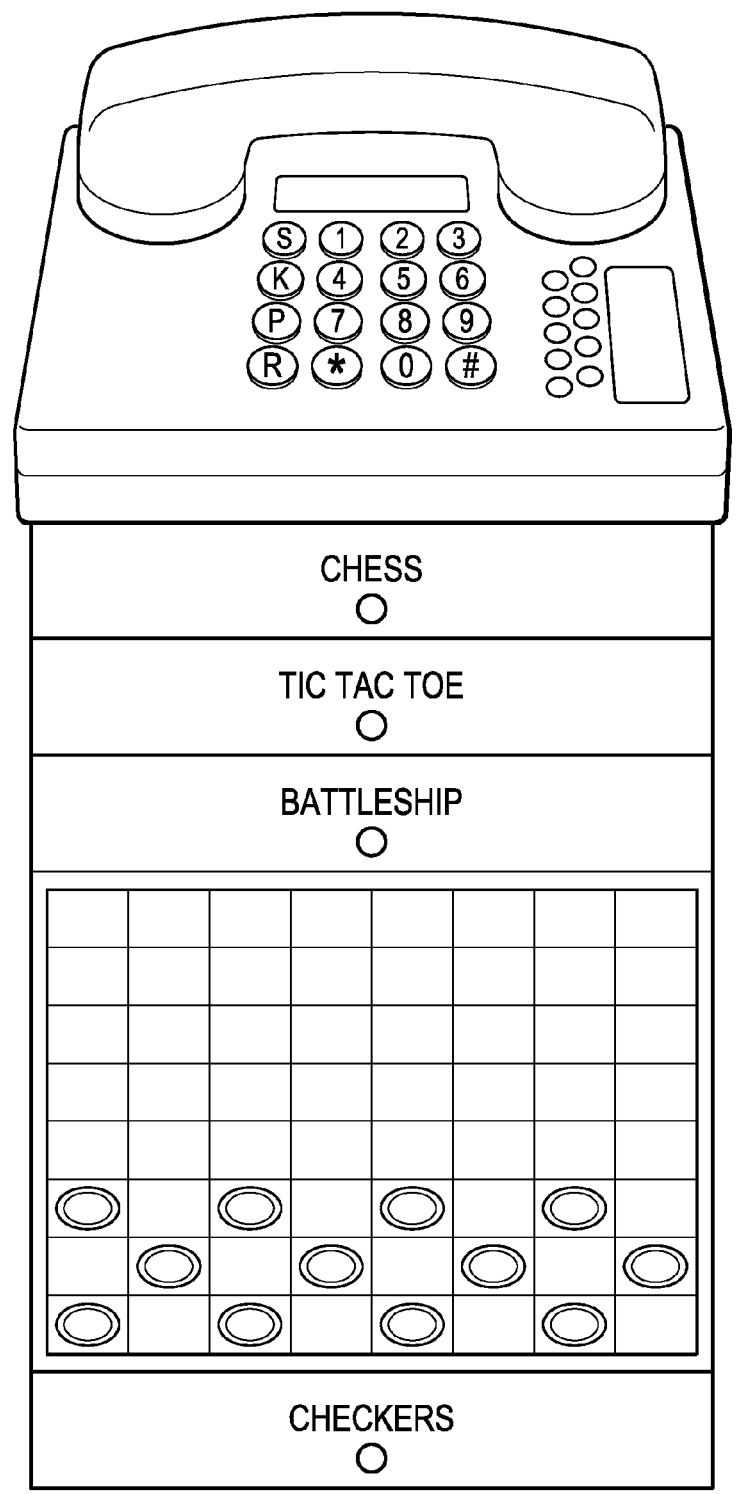

FIG. 5D shows another embodiment of the present invention. A communications terminal (e.g., a wired telephone) contains multiple electronic game boards (e.g., chess, tic-tac-toe, battleship, checkers, or the like) inserted into its base. The game boards can be pulled out as desired, or they can be spring loaded and pop out when a button on a particular game board is depressed. Ribbon cable may be used to connect the circuitry from the individual game boards to the connectors on the terminal. Each of these electronic game boards provide specialized software and functions to play a particular game.

FIGS. 6A, 6B and 6C provide examples of where auxiliary connectors may be positioned on the side of a wireless telephone (FIG. 6A) in accordance with the present invention. For PC cards, a multi-pin connector (FIG. 6B) affixed along the length of the PC card may be inserted into a rectangular mating connector residing in the side of the wireless telephone. Such a connector would provide stability and preferably position the PC board for proper viewing in the case where an electronic game board/display is used. In other cases, a multi-pin circular connector may be used, as shown in FIG. 6C.

Figure 7:
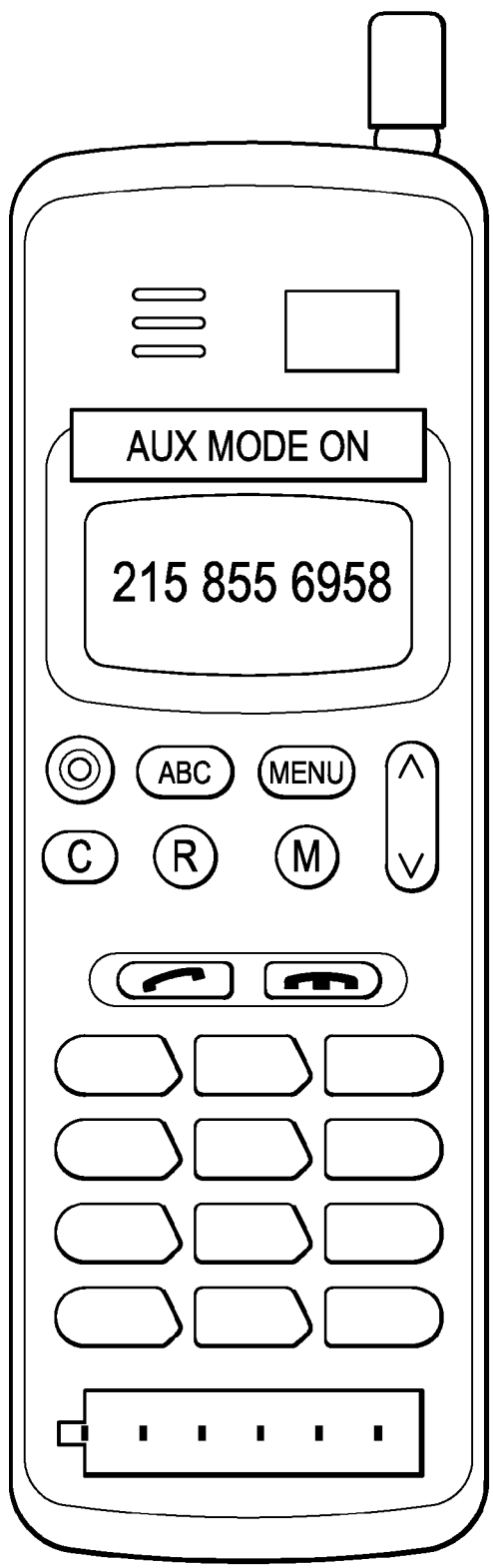
FIG. 7 illustrates an auxiliary connector on the face of a wireless telephone in an exemplary embodiment of the present invention.

As shown in FIG. 7, a connector may be positioned on the face of a wireless telephone. Any place where there is available room to house auxiliary connectors would be considered for different applications and designs.

Figure 8:
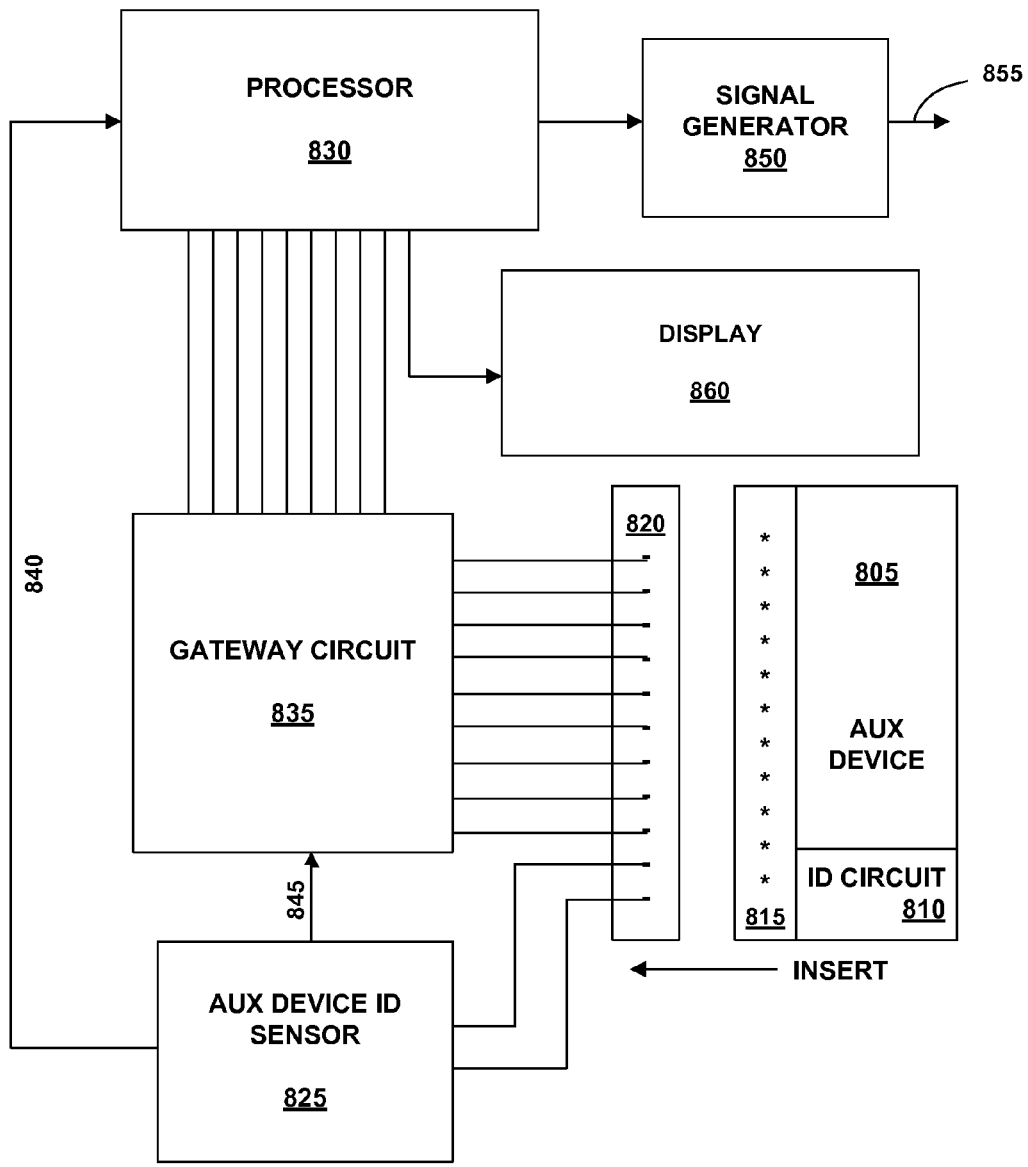
FIG. 8 shows a circuit for selectively coupling an auxiliary device to a processor within a communications device in an embodiment of the present invention.

FIG. 8 shows a circuit that interfaces with an IRAD in accordance with one embodiment of the present invention. When connector 815 of IRAD 805 is inserted into connector 820 of a communications device, an auxiliary device ID sensor 825 detects a characteristic (e.g., resistance, binary code, voltage, current, or the like) provided by an ID circuit 810 residing within IRAD 805. The auxiliary device ID sensor 825 may determine whether the characteristic is recognizable and/or valid, or the auxiliary device ID sensor 825 may simply forward the characteristic to a processor 830 in the communications device via path 840 to make that determination. In either case, if the characteristic is recognizable and/or valid, the auxiliary device ID sensor 825 will activate a gateway circuit 835 via path 845 which enables processor 830 to interact with IRAD 805 via gateway circuit 835 and connectors 815/820. Gateway circuit 835 may use one or more of a plurality of switches, diodes, transistors, integrated circuits, and other well-known components to selectively connect processor 830 to connector 820 after the IRAD 805 has been identified. This process prevents the circuitry in the IRAD 805 and/or in processor 830 from being subject to damaging signal voltages, currents, or the like, if the IRAD 805 is incorrectly inserted or if IRAD 805 is not compatible with the processor 830 in the communications device. Thus, connector 820 will be coupled to processor 830 through gateway circuit 835 only after an acceptable IRAD 805 is inserted into connector 820. Processor 830 will also forward valid auxiliary device ID information to signal generator 850, which will output the information over a communications link 855 previously established by the communications device. Furthermore, display 860 will present the ID information to confirm to the user that it has recognized the inserted IRAD 805.

Figure 9:
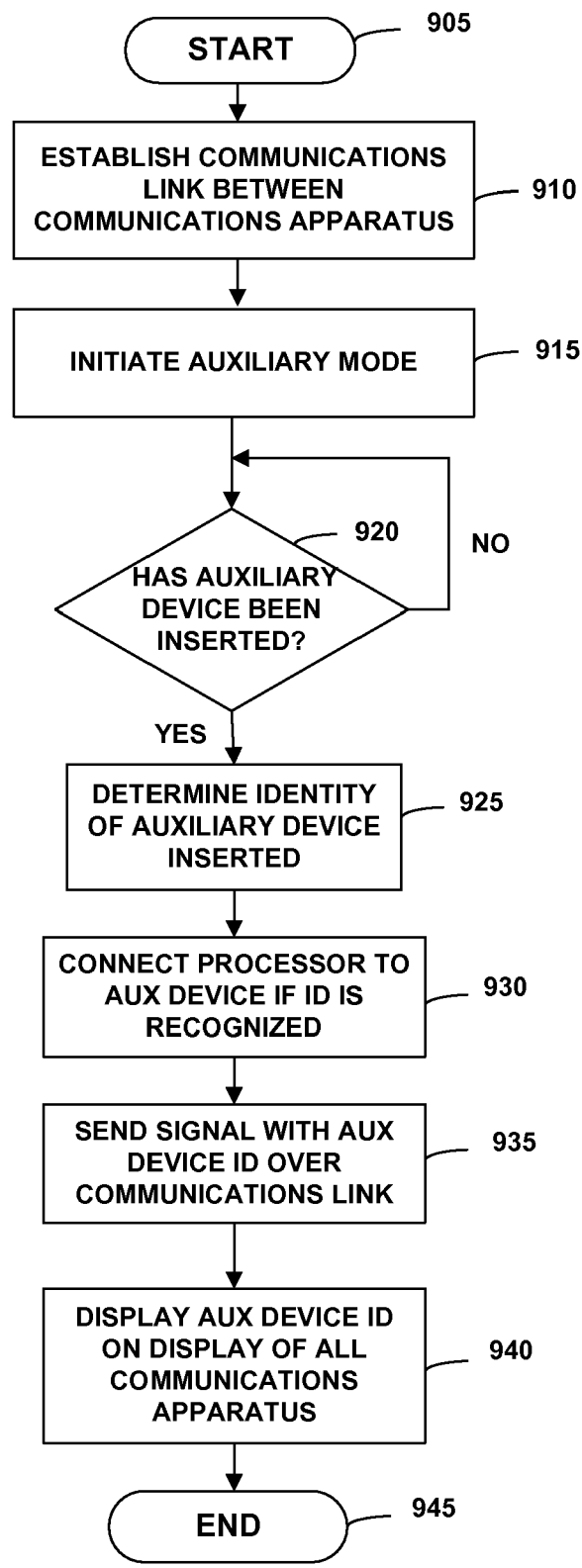
FIG. 9 is a flow chart illustrating the method steps used to initiate and validate auxiliary devices that interface with a communications apparatus in accordance with the present invention.

FIG. 9 illustrates a flow chart of a method for using an IRAD with communications devices in accordance with the present invention. The method is initiated in step 905. In step 910, a user of one of the communications devices either receives a call from a party or places a call to a party to establish a communications link. The user and the party using similar communications devices may carry out conventional communications for any length of time, prior to executing the features of the present invention. At any time desired while the communications link is established, either the user or the party may initiate an auxiliary mode of their communications device by depressing a switch residing on the surface of their communication device (step 915). The communications device will then wait for an IRAD to be inserted (step 920). Once inserted, the communications device will attempt to determine the identity of the inserted IRAD (step 925). If the identity of the inserted IRAD is recognized and considered valid, a processor within the communications device will be coupled to the IRAD (step 930). The communication device will then send a signal including the IRAD's identity over the communications link to the other communications device (step 935). The IRAD's identity will be presented (e.g., displayed, audibly outputted) on each of the communications devices (step 940). The method terminates at step 945.

Figure 10:
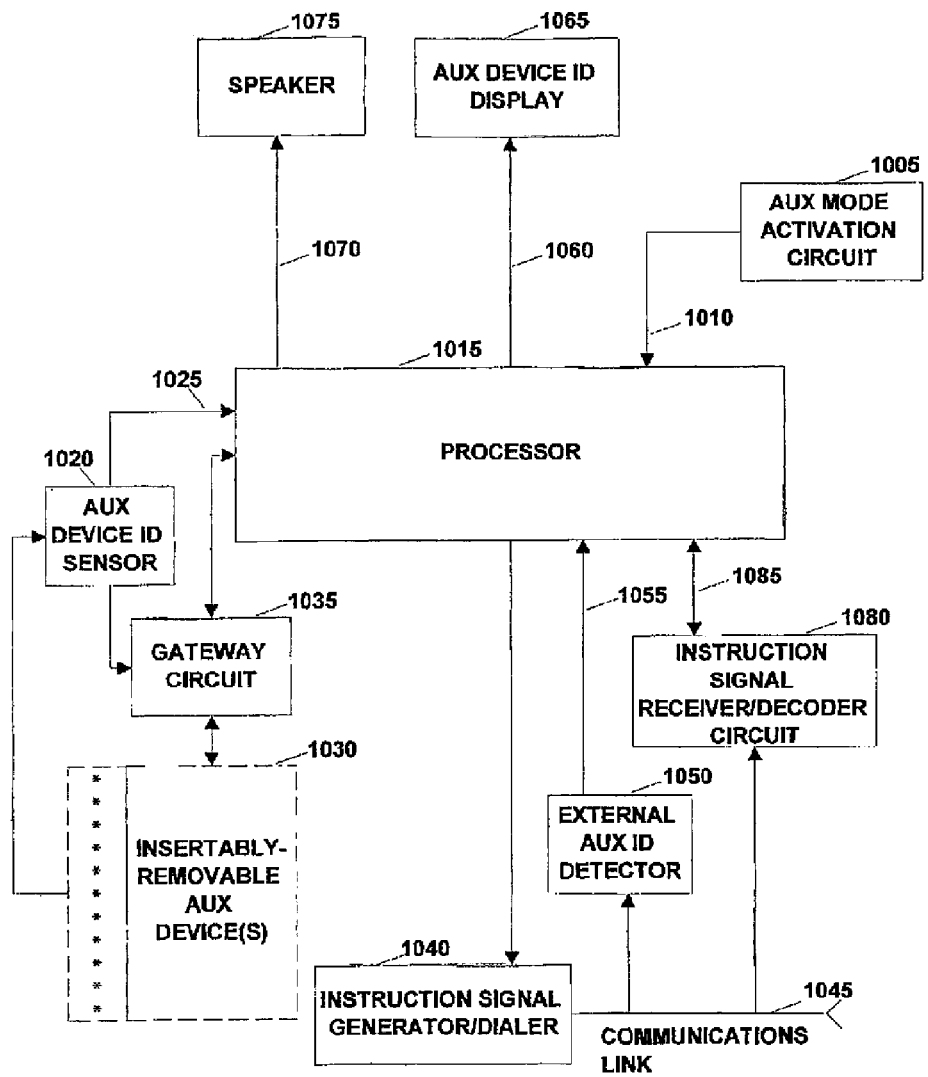
FIG. 10 shows a circuit of a communications device that communicates with at least one other communications device, both devices using auxiliary devices in accordance with the present invention.

FIG. 10 illustrates terminal circuitry used to implement the present invention. Upon a user depressing a switch that causes a terminal to go into an auxiliary mode when an auxiliary mode activation circuit 1005 sends a signal via path 1010 to a processor 1015, processor 1010 waits for a signal to be sent by an auxiliary device ID sensor 1020 via path 1025. Once an IRAD 1030 is inserted into an auxiliary connector such that it couples with gateway circuit 1035 and auxiliary device ID sensor 1020 (also see FIG. 8), the auxiliary device ID sensor 1020 seeks at least one characteristic of the IRAD 1030 and sends a signal to processor 1015 indicating the characteristic and/or whether the characteristic is valid. It should be understood that there may be several gateway circuits 1035 and auxiliary device ID sensors 1020 to handle different types of IRADs 1030 inserted into different auxiliary connectors. It should also be understood that a single auxiliary device ID sensor 1020 and gateway circuit 1035 may be designed such that several IRADs 1030 of different types may be handled simultaneously, or in succession. Processor 1015 will forward valid ID information to instruction signal generator/dialer 1040 which will forward such information over a communications link 1045 (e.g., connected to an antenna, telephone line, or the like). When a communications device on the other end of the communications link sends auxiliary device ID information over the communications link 1045, it is received and routed to external auxiliary ID detector 1050. External auxiliary ID detector 1050 checks the validity of the received information and forwards valid information to processor 1015 via path 1055. Any valid auxiliary device ID information may be forwarded by processor 1015 in a text format via path 1060 and presented on auxiliary device ID display 1065. The same auxiliary device ID information may be forwarded by processor 1015 in an audible format via path 1070 and outputted by speaker 1075. If an IRAD 1030 is inserted for the purpose of playing a game over the communications link 1045, an instruction signal receiver/decoder circuit 1080 is used to receive and decipher game move instructions received from all game players, and forward the deciphered instructions via path 1085 to the processor 1015. Processor 1015 will operate in conjunction with the IRAD 1030 to facilitate the processing of the game.

An apparatus and method using insertably-removable auxiliary devices (IRADs) to play games and to provide a means for interfacing different types of auxiliary apparatus with a portable telephone is described herein. These specific arrangements and methods described herein are merely illustrative of the principles of the present invention. Numerous modifications in form and detail may be made by those of ordinary skill in the art without departing from the spirit and scope of the present invention. Although this invention has been shown in relation to a particular embodiment, it should not be considered so limited. Rather, the present invention is limited only by the scope of the appended claims.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed:
1. A mobile device, comprising:
a processor coupled to an inner portion of a mobile device housing;
a detachable wireless receiver coupled to a connector, wherein the connector is coupled to the mobile device housing; and
an input mechanism configured to receive a user input indicative of a game, wherein instructions indicative of the game are stored on at least one wireless game cartridge of a plurality of wireless game cartridges, each of the plurality of wireless game cartridges storing instructions indicative of a different game, wherein the processor is programmed to cause the detachable wireless receiver to a selectively establish a wireless communication channel with the at least one wireless game car- tridge, wherein the processor is programmed to receive, via the detachable wireless receiver, the instructions indicative of the game stored on the at least one wireless game cartridge, and wherein the processor is programmed to execute the instructions indicative of the game while the wireless receiver is wirelessly communicating with the at least one wireless game cartridge.

2. The mobile device of claim 1, further comprising:
a wireless cellular transceiver configured to communicate with a cellular network.

3. The mobile device of claim 2, wherein the processor is programmed to receive, via the cellular network, second mobile device game information.

4. The mobile device of claim 2, wherein the processor is programmed to send, via the wireless cellular transceiver, audio based user input to a second device executing instructions indicative of the game.

5. The mobile device of claim 4 wherein the processor is programmed to send, via the wireless cellular transceiver, game information generated in response to executing the instructions indicative of game to a second device.

6. The mobile device of claim 5, wherein both the game information generated in response to executing the instructions indicative of game and the audio based user input are sent over a single wireless channel.

7. The mobile device of claim 1, wherein the processor is programmed to receive, via the detachable wireless receiver, tactile based user input.

8. The mobile device of claim 1, wherein the input mechanism is a keypad.

9. The mobile device of claim 1, further comprising:
a gateway circuit, wherein the gateway circuit is configured to couple the processor to the connector.

10. The mobile device of claim 1, wherein the processor is programmed to send, via a detachable wireless programmed transmitter, game information generated in response to executing the instructions indicative of the game to an electronic game board.

11. The mobile device of claim 1, further comprising:
a detachable processor programmed to execute the instructions indicative of the game.

12. The mobile device of claim 1, wherein the processor is programmed to send, via a detachable wireless transmitter, information indicative of game graphics to a display.

13. The mobile device of claim 12, wherein the display comprises a television.

14. The mobile device of claim 1, wherein the processor is further programmed to communicate, via a detachable wireless transmitter, with an auxiliary processor.

15. The mobile device of claim 1, wherein the processor is programmed to communicate, via a detachable wireless transmitter, with a set top box.

16. The mobile device of claim 1, further comprising:
an electronic game board coupled to the mobile device housing.

17. The mobile device of claim 1, wherein the processor is programmed to send, via a detachable wireless transmitter, audio signals generated by executing the instructions indicative of the game to a headset.

18. The mobile device of claim 1, wherein the processor is programmed to receive, via the wireless receiver, user input from a steering wheel.

19. The mobile device of claim 1, wherein the processor is programmed to receive, via the wireless receiver, user input from a joystick.

20. A method, comprising:
wirelessly communicating, via a cellular transceiver of a first mobile device, with a second mobile device;
receiving a user input indicative of a game, wherein instructions indicative of the game are stored on at least one wireless game cartridge of a plurality of wireless game cartridges, each of the plurality of wireless game cartridges storing instructions indicative of a different game;
selectively establishing, by a detachable wireless receiver coupled to a connector, a wireless communication channel between a processor of the first mobile device and the at least one wireless game cartridge, wherein the connector is coupled to a housing of the first mobile device;
receiving, via the detachable wireless receiver, the instructions indicative of the game stored on the at least one wireless game cartridge;
executing, by the processor of the first mobile device, the instructions indicative of the game; and
sending, via the cellular transceiver, game information generated by executing the instructions indicative of the game from the first mobile device to the second mobile device.

21. The method of claim 20, further comprising:
sending, via a detachable wireless transmitter, graphics generated in response to executing the game to a display.

22. The method of claim 20, further comprising:
receiving, via the detachable wireless receiver, user input configured to manipulate the executing game.

23. The method of claim 20, further comprising:
sending, via the wireless telecommunication channel of the cellular network, wireless headset audio based user input.

24. The method of claim 20, further comprising:
coupling, by a gateway circuit, the processor to the connector.

25. The method of claim 20, further comprising:
executing, by a detachable processor, the instructions indicative of the game.

26. A computer-readable memory device configured to be integrated within a housing of a mobile device, the computer-readable memory device comprising:
instructions to receive a user input indicative of a game, wherein instructions indicative of the game are stored on at least one wireless game cartridge of a plurality of wireless game cartridges, each of the plurality of wireless game cartridges storing instructions indicative of a different game;
instructions to selectively establish, by a detachable wireless receiver coupled to a connector on the housing, a wireless communication channel between a processor of the mobile device and the at least one wireless game cartridge;
instructions to receive, via the detachable wireless receiver, the instructions indicative of the game stored on the at least one wireless game cartridge; and
instructions to execute the instructions indicative of the game.

27. The computer-readable memory device of claim 26, further comprising:
instructions to send, via a detachable wireless transmitter, graphics generated in response to executing the game to a display.

28. The computer-readable memory device of claim 26, further comprising:
instructions to receive, via the detachable wireless receiver, user input configured to manipulate the game from a wireless user interface device.

* * * * *

UNITED STATES PATENT AND TRADEMARK OFFICE
CERTIFICATE OF CORRECTION

| | |
|---|---|
| PATENT NO. | : 7,951,007 B2 |
| APPLICATION NO. | : 11/765852 |
| DATED | : May 31, 2011 |
| INVENTOR(S) | : Wolinsky |

It is certified that error appears in the above-identified patent and that said Letters Patent is hereby corrected as shown below:

Column 10, line 66, in Claim 1, delete "to a" and insert -- to --.

Column 11, line 33, in Claim 10, delete "wireless programmed" and insert -- wireless --.

Signed and Sealed this

Twentieth Day of September, 2011

David J. Kappos
*Director of the United States Patent and Trademark Office*